US005729821A

United States Patent [19]

Knapp et al.

[11] Patent Number: 5,729,821

[45] Date of Patent: Mar. 17, 1998

[54] CONCENTRATION OF PERRHENATE AND PERTECHNETATE SOLUTIONS

[75] Inventors: Furn F. Knapp, Oak Ridge; Arnold L. Beets, Clinton; Saed Mirzadeh, Knoxville, all of Tenn.; Stefan Guhlke, Bonn, Germany

[73] Assignee: Lockheed Martin Energy Research Coirporation, Oak Ridge, Tenn.

[21] Appl. No.: 770,072

[22] Filed: Dec. 10, 1996

[51] Int. Cl.$^6$ .......... C01G 41/00

[52] U.S. Cl. .......... 423/2; 423/249; 250/432 PD; 424/1.11

[58] Field of Search .......... 423/2, 249; 424/1.11; 250/432 PD

[56] References Cited

U.S. PATENT DOCUMENTS

| | | | |
|---|---|---|---|
| 4,123,497 | 10/1978 | Ruddock | 423/2 |
| 4,778,672 | 10/1988 | Deutsch et al. | 424/1.1 |
| 4,935,222 | 6/1990 | Deutsch et al. | 424/1.1 |
| 5,186,913 | 2/1993 | Knapp et al. | 423/2 |
| 5,275,802 | 1/1994 | Knapp et al. | 424/129 |

OTHER PUBLICATIONS

Singh, J. et al., "Studies on the Preparation and Isomeric Composition of Re–186–and Re–188–Pentavalent Rhenium Dimercaptosuccinic Acid Complex," *Nucl. Med. Commun.*, 14, 197–203 (1993).

Blower, P. J., "Extending the Life of a Tc–99m Generator. A Simple and Convenient Method for Concentrating Generator Eluate for Clinical Use," *Nucl. Med. Commun.*, 1, 995–997 (1993).

Seifer, et al., "Highly Concentrated [Tc–99m]Pertechnetate Solutions from (n,˜)Mo–99/Tc–99m Generators for Nuclear Medical Use," *Appl. Radiat. Isot.*, 45, 577–579 (1994).

*Primary Examiner*—Ngoclan Mai
*Attorney, Agent, or Firm*—Joseph A. Marasco

[57] ABSTRACT

A method of preparing a concentrated solution of a carrier-free radioisotope which includes the steps of:

a. providing a generator column loaded with a composition containing a parent radioisotope;

b. eluting the generator column with an eluent solution which includes a salt of a weak acid to elute a target daughter radioisotope from the generator column in a first eluate.

c. eluting a cation-exchange column with the first eluate to exchange cations of the salt for hydrogen ions and to elute the target daughter radioisotope and a weak acid in a second eluate;

d. eluting an anion-exchange column with the second eluate to trap and concentrate the target daughter radioisotope and to elute the weak acid solution therefrom; and e. eluting the concentrated target daughter radioisotope from the anion-exchange column with a saline solution.

8 Claims, 1 Drawing Sheet

CONCENTRATION OF PERRHENATE AND PERTECHNETATE SOLUTIONS

The United States Government has rights in this invention pursuant to contract no. DE-AC05-96OR22464 between the United States Department of Energy and Lockheed Martin Energy Research Corporation.

CROSS-REFERENCE TO RELATED APPLICATIONS

U.S. patent application Ser. No. 08/619,376, filed on May 22, 1996, entitled, "Technetium-99m Generator System", describes a $^{99}Mo/^{99m}Tc$ generator system which includes a sorbent column loaded with a composition containing $^{99}Mo$. The sorbent column has an effluent end in fluid communication with an anion-exchange column for concentrating $^{99m}Tc$ eluted from the sorbent column.

A method of preparing a concentrated solution of $^{99m}Tc$ includes the general steps of:

a. providing a sorbent column loaded with a composition containing $^{99}Mo$, the sorbent column having an effluent end in fluid communication with an anion-exchange column;

b. eluting the sorbent column with a salt solution to elute $^{99m}Tc$ from the sorbent and to trap and concentrate the eluted $^{99m}Tc$ on the ion-exchange column; and c. eluting the concentrated $^{99m}Tc$ from the ion-exchange column with a solution comprising a reductive complexing agent.

FIELD OF THE INVENTION

The present invention relates to methods for concentrating extremely dilute solutions of radioisotopes, and more particularly to such methods which involve tandem generators and selective anion trapping steps.

BACKGROUND OF THE INVENTION

Radionuclide generator systems often involve the chromatographic separation of a radioactive daughter species formed by radioactive decay of a radioactive parent species. As an example, the parent is tightly bound to an adsorbent (sorbent) material having a high partition coefficient ($K_D$ value). The radioactive daughter is continuously formed by decay of the parent. Properly selective adsorbent and eluent solutions are used so that the daughter has a low $K_D$ value and can be removed from the column, for instance, by eluting the column with a solution (i.e. eluent) of physiological saline (0.9% NaCl).

The clinical use of radioisotope generators such as the tungsten-188/rhenium-188 and molybdenum-99/technetium-99m generator systems in the general radiopharmacy or hospital setting requires simple methods using solution chemistry. Typical radioisotope generators involve elution of tungsten-188/rhenium-188 or molybdenum-99/technetium-99m with a salt solution. The widely used molybdenum-99/technetium-99m generator is usually eluted with physiological saline solution (0.9% NaCl) which is biologically compatible and also compatible for technetium-99m labeling of the various commercial "kits" used for organ imaging in the clinical specialty known as nuclear medicine.

For subsequent attachment of the eluted daughter radioisotope to an agent for clinical use, concentration of the radioisotope solutions is usually required. Often, the parent radioisotope is produced with low specific activity (units of radioactivity per unit mass), which requires a large amount of adsorbent to bind the parent. Because of the large amount of adsorbent, a large volume of the eluent solution is required for elution of the daughter, which results in a low specific volume (level of radioactive radioisotope per unit volume, for example, mCi/mL).

Methods for concentration of the daughter solution are thus generally required for practical use. In general, concentration of rhenium-188 or technetium-99m solutions involves selective separation of microscopic levels of one anion (i.e. the desired Re-188-perrhenate or Tc-99m-pertechnetate which are produced carrier-free) from macroscopic levels of a second anion (i.e. from the salt solution used for generator elution).

For further background information, please refer to the following U.S. patents and other publications:

U.S. Pat. No. 5,186,913, Issued Feb. 17, 1993, and also U.S. Pat. No. 5,275,802, Issued Jan. 4, 1994, to F. F. Knapp, et al., both entitled, "Tungsten188/Carrier-Free Rhenium-188 Perrhenic Acid Generator System" describes a tandem system using a cation-exchange column to provide dilute solutions of rhenium-188 perrhenate. The cations are removed but the volume is not concentrated. An anion-exchange column is used to trap the perrhenate which is then removed in a concentrated form with nitric acid.

U.S. Pat. No. 4,778,672, issued on Oct. 18, 1988 to E. A. Deutsch, et al., entitled, "Method of Isolating Radioactive Perrhenate or Pertechnetate From An Aqueous Solution", and also U.S. Pat. No. 4,935,222, issued on Jun. 19, 1990, to E. A. Deutsch, et al., entitled, "Procedure for Isolating and Purifying Radioactive Ligated Rhenium Pharmaceuticals and Use Thereof and Kit", describe trapping of hydrophilic lipophilic salts of perrhenate or pertechnetate on lipophilic columns.

Singh, J. et al., "Studies on the Preparation and Isomeric Composition of Re-186- and Re-188-Pentavalent Rhenium Dimercaptosuccinic Acid Complex," *Nucl. Med. Commun., 14, 197–203* (1993), and also Blower, P. J., "Extending the Life of a Tc-99m Generator. A Simple and Convenient Method for Concentrating Generator Eluate for Clinical Use," *Nucl. Med. Commun.,* 1, 995–997 (1993) describe tandem systems using silver bound to cation-exchange columns for removal of halide ions from the saline generator eluant with subsequent trapping of perrhenate on an anion-exchange column for elution with saline solution.

Seifer, et al., "Highly Concentrated [Tc-99m] Pertechnetate Solutions from (n,~)Mo-99/Tc-99m Generators for Nuclear Medical Use," *Appl. Radiat. Isot.,* 45, 577–579 (1994) describes trapping of reduced pertechnetate species obtained by reduction of the sodium pertechnetate in the sodium nitrite eluant from the Mo-99/Tc-99m generator on alumina and then re-elution with an oxidizing agent such as hydrogen peroxide in ammonia. A final concentrated solution of sodium perrhenate is then obtained.

OBJECTS OF THE INVENTION

Accordingly, objects of the present invention include the provision of a new, simple, effective method of concentrating rhenium-188 solutions obtained from tungsten-188/rhenium-188 generators, and concentrating technetium-99m pertechnetate solutions obtained from molybdenum-99/technetium-99m generator systems.

Further and other objects of the present invention will become apparent from the description contained herein.

SUMMARY OF THE INVENTION

In accordance with one aspect of the present invention, the foregoing and other objects are achieved by a method of preparing a concentrated solution of a carrier-free radioisotope which includes the steps of:

a. providing a generator column loaded with a composition containing a parent radioisotope;

b. eluting the generator column with an eluent solution which includes a salt of a weak acid to elute a target daughter radioisotope from the generator column in a first eluate;

c. eluting a cation-exchange column with the first eluate to exchange cations of the salt for hydrogen ions to form a weak acid and to elute the target daughter radioisotope and the weak acid in a second eluate;

d. eluting an anion-exchange column with the second eluate to trap and concentrate the target daughter radioisotope and to elute the weak acid solution therefrom; and e. eluting the concentrated target daughter radioisotope from the anion-exchange column with a saline solution.

In accordance with another aspect of the present invention, a method of preparing a concentrated solution of carrier-free rhenium-188 perrhenate includes the steps of:

a. providing a generator column loaded with a composition containing $^{188}W$;

b. eluting the generator column with an eluent solution which includes a salt of a weak acid to elute $^{188}Re$ from the generator column in a first eluate;

c. eluting a cation-exchange column with the first eluate to exchange cations of the salt for hydrogen ions to form a weak acid and to elute the $^{188}Re$ and the weak acid solution in a second eluate;

d. eluting an anion-exchange column with the second eluate to trap and concentrate the $^{188}Re$ and to elute the weak acid solution therefrom; and e. eluting the concentrated $^{188}Re$ from the anion-exchange column with a saline solution.

In accordance with further aspect of the present invention, a method of preparing a concentrated solution of carrier-free technetium-99m pertechnetate which includes the steps of:

a. providing a generator column loaded with a composition containing $^{99}Mo$;

b. eluting the generator column with an eluent solution which includes a salt of a weak acid to elute $^{99m}Tc$ from the generator column in a first eluate.

c. eluting a cation-exchange column with the first eluate to exchange cations of the salt for hydrogen ions and to elute the $^{99m}Tc$ and a weak acid solution in a second eluate;

d. eluting an anion-exchange column with the second eluate to trap and concentrate the $^{99m}Tc$ and to elute the weak acid solution therefrom; and e. eluting the concentrated $^{99m}Tc$ from the anion-exchange column with a saline solution.

Figure 1:
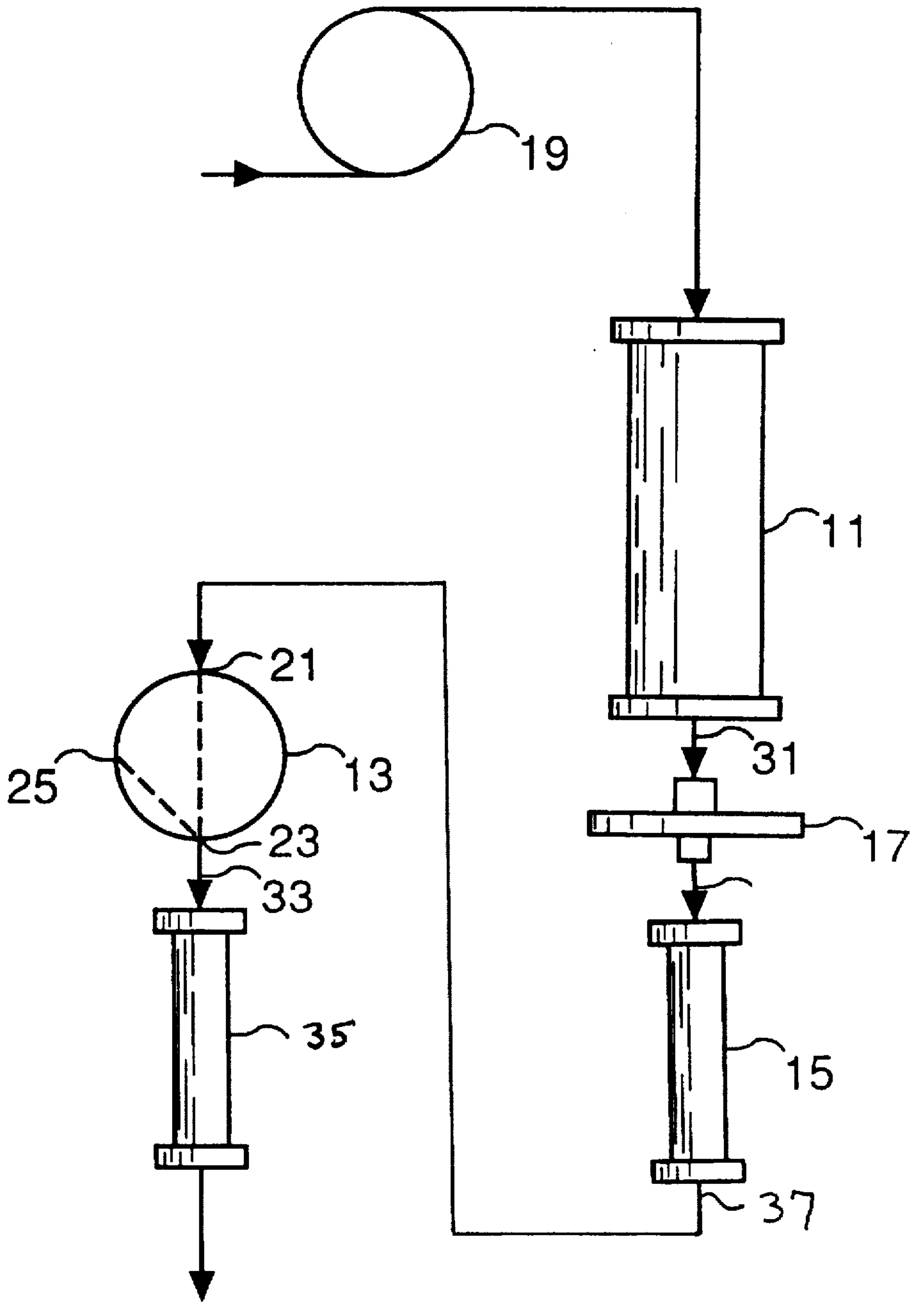
FIG. 1 is a schematic illustration of an apparatus suitable for use in carrying out the present invention.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention involves selective anion column trapping of carrier-free radioisotope anions, especially perrhenate or pertechnetate anions in the presence of a weak acid in order to concentrate rhenium-188 perrhenate or technetium-99m pertechnetate anions obtained by elution of tungsten-188/rhenium-188 or molybdenum-99/technetium-99m generators, respectively.

A weak acid is defined as an acid "which ionizes little and yields but few hydrogen ions in aqueous solution" in *Concise Chemical and Technical Dictionary*, H. Bennett, Editor, Chemical Publishing Co., Inc., New York, N.Y., 1986. It will be seen from the description set forth hereinbelow that it is critical that a weak acid used for carrying out the present invention be characterized and defined by an ionization constant (pKa) within an operable range:

1. The weak acid must have a pKa value above that of the target daughter radioisotope. For example perrhenic acid has pKa=−1.25 and pertechnic acid has pKa=0.3.
2. The weak acid must have a pKa value below that which would cause significant breakthrough of the parent isotope into the generator eluate.

Referring to FIG. 1, the first column 11, which is generally a well known, conventional isotope generator column, is eluted with a dilute (0.1M–0.5M) solution of a salt of a weak acid, preferably an ammonium acetate or ammonium citrate solution to elute the radioisotope in a first eluate. Ammonium is a preferred cation because of its suitability for ion-exchange processing.

Subsequently, the first eluate is eluted through a second column 15 which contains a strongly acidic cation-exchange material, for example, Maxi-Clean IC/H Plus, available from Alltech Associates, Inc., Deerfield, Ill. In the second column, ammonium cations are exchanged for hydrogen ions to elute a second eluate which is a weak acetic acid solution containing the radioisotope in the form of perrhenic acid or pertechnic acid.

Subsequently, the second eluate is eluted through a third column 35 which contains an anion-exchange material which selectively traps the radioisotope. The acetic or citric acid is weakly and insignificantly ionized in the pH range of the eluent (generally in the range of pH 2.5 to pH 5, usually about pH 3). Perrhenic acid (pKa=−1.25) and pertechnic acid (pKa=0.3) are fully ionized in this pH range and are thus sorbed, or "trapped" on the anion-exchange column. Thus, the radioisotope is separated from the acetic acid and concentrated on the anion-exchange column. A preferred anion-exchange material is QMA Sep-Pak Cartridge, available from Waters Division of Millipore Corp., Milford, Mass.

Finally, a minimum volume of saline solution is used to elute the radioisotope from the anion-exchange column with in the form of sodium perrhenate ($NaReO_4$) and sodium pertechnetate ($NaTcO_4$). The volume of saline required depends upon the void volume and mass of the column. A commercially available 0.8 mL QMA column has been used but this value can be decreased significantly by using smaller columns. Since the anion trapping step involves trapping only the carrier-free radioisotope anion, the anion column can be miniaturized such that elution of the radioisotope requires only a very small volume of saline solution.

It should be noted that various weak acid salts are suitable for carrying out the present invention. For example, cations such as ammonium, lithium, sodium, potassium, calcium, etc., and weak acids such as acetic, citric, succinic, fumaric, malic, tartaric, phthalic, etc. are expected to be suitable in various combinations.

Moreover, various cation, and anion column materials are suitable for carrying out the present invention. Those which are described herein are examples which are shown herein to be quite suitable.

It is evident from the above description that a weak acid is selected on the basis of an ionization potential (pKa) which results in insignificant ionization thereof at the pH of the eluate of the cation-exchange column. Thus, there is not another anion to "compete" with binding of the microscopic levels of the perrhenate anion for selective trapping during subsequent elution through an anion-exchange column. The ideal weak acid will:

1. Prevent breakthrough of the parent anion from the generator column while eluting the target radioisotope.
2. Completely flute from the anion-exchange column, allowing the target radioisotope to be trapped and concentrated thereon.

Apparatus suitable for use in carrying out the present invention is shown schematically in FIG. 1, with arrows showing the flow of fluid into and out of system components. A radioisotope generator column 11, generally having a capacity of about 25–1000 mL, is in fluid communication with a smaller cation-exchange column 15, which generally has a capacity of about 1–5 mL. A submicron filter (for example, 0.221 m) 17 is preferably located at the exit end 31 of the alumina column for preventing adsorbent particles from contaminating the cation-exchange column 15. A peristaltic or other type of pump 19 can be used to force fluid through the system.

The cation-exchange column 15 is in fluid communication with an anion-exchange column 35, which also generally has a capacity of about 1–5 mL, the smallest possible capacity being preferred.

In a preferred configuration, a first port 21 of the three-way valve 13 is attached to the effluent 37 of the cation-exchange column 15, and a common port 23 of the three-way valve 13 is attached to the inlet 33 of the anion-exchange column 35. A second port 25 of the three-way valve 13 is used to introduce fluids directly into the anion-exchange column 35 in order to perform functions such as elution of radioisotope solutions therefrom and regeneration and washing thereof.

The function of the three-way valve 13 can be achieved by a simple Y-connection, with back-flow preventing means such as pinchcocks or check valves in the influent lines (not illustrated). Check valves would not require attention such as that needed to operate pinchcocks or a three-way valve. It is also evident to those skilled in the art that there are other possible configurations of various conventional components that are suitable for carrying out the present invention. The invention is not limited by the apparatus used to carry out the method.

EXAMPLE I

A tungsten188/rhenium-188 generator was fluted with a dilute ammonium acetate solution (0.13M). The generator (first) eluate was fluted through a strong cation-exchange column as described hereinabove where the ammonium cations were exchanged for hydrogen ions (H+) to form a second fluent of rhenium-188 perrhenate in an acetic acid solution. The acetic acid was generally not ionized in the pH range (pH=3) of the second eluent, subsequent passage of the eluant through an anion-exchange column as described hereinabove resulted in selective trapping of the perrhenate anion, with the bulk of the solution passing through. Following washing of the anion column with distilled water to remove remaining acetic acid, the rhenium-188 perrhenate was eluted with a small volume of physiological saline solution.

EXAMPLE II

Technetium-99m pertechnetate is prepared using a molybdenum-99/technetium-99m generator and the method described in Example I hereinabove.

EXAMPLE III

A tungsten188/rhenium-188 generator was eluted with a dilute ammonium titrate solution (0.13M). Subsequently, the method of the present invention was carried out as described in Example I hereinabove to prepare rhenium-188 perrhenate.

EXAMPLE IV

Technetium-99m pertechnetate is prepared using a molybdenum-99/technetium-99m generator and the method described in Example I hereinabove.

Only a very small amount of the acetate anion (calculated as <0.1%) is expected to be present in the cation column eluent. This small amount of acetate will be trapped by the anion column in addition to the radioisotope anion, and is expected to be also removed by subsequent elution with saline solution. Since sodium acetate is a common physiologically compatible substance used in many pharmacological preparations, this will not present a problem. The system can be readily automated and can be provided as a sterile "Concentrator Unit".

Unique features and advantages of the present invention include:

1. The present invention provides highly concentrated solutions of perrhenate or pertechnetate from dilute generator eluent solutions.
2. The present invention provides an inexpensive, efficient, and simple disposable system which can be provided as a miniaturized "Concentrator Kit" which is easily sterilized for one-time use,
3. The present invention provides a final solution which uses physiologically compatible materials.
4. The present invention provides a final perrhenate or pertechnetate solution with essentially no excipients or additional chemical species. The solution contains only the carrier-free rhenium-188 perrhenate or technetium-99m pertechnetate.
5. The present invention provides a method which is easily automated for concentration of perrhenate and pertechnetate solutions,
6. Sterile ammonium acetate solutions for generator elution are commercially available.
7. Technetium-99m obtained by the present invention can be used directly for radiolabeling of the large number of commercially available "kits" which are used for to prepare tissue imaging agents, and rhenium-188 obtained in this manner can be used for preparation of the well known HEDP, DMSA and MAC3 therapeutic agents for conventional clinical use.

While there has been shown and described what are at present considered the preferred embodiments of the invention, it will be obvious to those skilled in the art that various changes and modifications can be made therein without departing from the scope of the inventions defined by the appended claims.

What is claimed is:

1. A method of preparing a concentrated solution of a carrier-free radioisotope comprising the steps of:

a. providing a generator column loaded with a composition containing a parent radioisotope;

b. eluting said generator column with an eluent solution comprising a salt of a weak acid to elute a target daughter radioisotope from said generator column in a first eluate;

c. eluting a cation-exchange column with said first eluate to exchange cations of said salt for hydrogen ions to form a weak acid and to elute said target daughter radioisotope and said weak acid in a second eluate;

d. eluting an anion-exchange column with said second eluate to trap and concentrate said target daughter radioisotope and to elute said weak acid solution therefrom; and e. eluting said concentrated target daughter radioisotope from said anion-exchange column with a saline solution.

2. A method in accordance with claim 1 wherein said weak acid comprises acetic acid or citric acid.

3. A method in accordance with claim 1 wherein said target daughter isotope comprises $^{99m}$Tc.

4. A method in accordance with claim 1 wherein said target daughter isotope comprises $^{188}$Re.

5. A method of preparing a concentrated solution of carrier-free rhenium-188 perrhenate comprising the steps of:

a. providing a generator column loaded with a composition containing $^{188}$W;

b. during said generator column with an eluent solution comprising a salt of a weak acid to elute $^{188}$Re from said generator column in a first eluate;

c. eluting a cation-exchange column with said first eluate to exchange cations of said salt for hydrogen ions to form a weak acid and to elute said $^{188}$Re and said weak acid solution in a second eluate;

d. eluting an anion-exchange column with said second eluate to trap and concentrate said $^{188}$Re and to elute said weak acid solution therefrom; and e. eluting said concentrated $^{188}$Re from said anion-exchange column with a saline solution.

6. A method in accordance with claim 5 wherein said weak acid comprises acetic acid or citric acid.

7. A method of preparing a concentrated solution of carrier-free technetium-99m pertechnetate comprising the steps of:

a. providing a generator column loaded with a composition containing $^{99}$Mo;

b. eluting said generator column with an eluent solution comprising a salt of a weak acid to elute $^{99m}$Tc from said generator column in a first eluate;

c. eluting a cation-exchange column with said first eluate to exchange cations of said salt for hydrogen ions to form a weak acid and to elute said $^{99m}$Tc and said weak acid solution in a second eluate;

d. eluting an anion-exchange column with said second eluate to trap and concentrate said $^{99m}$Tc and to elute said weak acid solution therefrom; and e. eluting said concentrated $^{99m}$Tc from said anion-exchange column with a saline solution.

8. A method in accordance with claim 7 wherein said weak acid comprises acetic acid or citric acid.

* * * * *